US010068026B1

(12) United States Patent
Carrington

(10) Patent No.: US 10,068,026 B1
(45) Date of Patent: *Sep. 4, 2018

(54) SYSTEM FOR RETRIEVING AND SERVING THE REGULATORY HISTORY OF A PROPERTY INCLUDING MOBILE WIRELESS COMMUNICATIONS DEVICE BASED SEARCHING AND RETRIEVAL AND RELATED METHODS

(71) Applicant: Unearthed Land Technologies, LLC, Maitland, FL (US)

(72) Inventor: Charles C. Carrington, Cocoa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,244

(22) Filed: Dec. 19, 2016

Related U.S. Application Data

(63) Continuation-in-part of application No. 15/006,856, filed on Jan. 26, 2016, now Pat. No. 9,563,642, which is a continuation of application No. 14/079,217, filed on Nov. 13, 2013, now Pat. No. 9,275,357, which is a continuation of application No. 13/606,656, filed on Sep. 7, 2012, now Pat. No. 8,606,747, which is a continuation of application No. 12/434,489, filed on May 1, 2009, now Pat. No. 8,271,431, which is a continuation-in-part of application No. 12/419,112, filed on Apr. 6, 2009, now abandoned, which is a continuation-in-part of application No. 12/252,413, filed on Oct. 16, 2008, now abandoned, which is a
(Continued)

(51) Int. Cl.
*G06F 7/00* (2006.01)
*G06F 17/30* (2006.01)
*G06Q 50/16* (2012.01)

(52) U.S. Cl.
CPC .... *G06F 17/3087* (2013.01); *G06F 17/30241* (2013.01); *G06Q 50/163* (2013.01)

(58) Field of Classification Search
CPC ........ G06Q 10/10; G06Q 10/06; G06Q 50/18; G06Q 50/16; G06Q 50/163; G06F 17/30241; G06F 17/3087; G06F 17/30312
USPC ........ 707/693, 706, 736, 603, 610, 741, 770
See application file for complete search history.

(56) References Cited

U.S. PATENT DOCUMENTS

2005/0071376 A1* 3/2005 Modi ...................... G06Q 10/00
2005/0080702 A1* 4/2005 Modi ..................... G06Q 40/06
705/36 R
(Continued)

*Primary Examiner* — Md I Uddin
(74) *Attorney, Agent, or Firm* — Allen, Dyer, Doppelt + Gilchrist, P.A.

(57) ABSTRACT

A mobile wireless device controller may, based upon an input device, communicate with first remote computers to store the land use based regulatory history data, and search for a real property to determine which of the first remote computers has land use based regulatory history data available for the real property. The controller may also retrieve land use based regulatory history data from a second remote computer different than the first remote computers, when the land use based regulatory history data available for the given real property does not exceed a threshold amount or when one of the first remote computers is not from a predetermined one thereof. The land use based regulatory history data for the real property may be provided to a user interface when the threshold amount is exceeded or when the first remote computers includes the predetermined one.

17 Claims, 8 Drawing Sheets

Related U.S. Application Data continuation-in-part of application No. 11/945,988, filed on Nov. 27, 2007, now abandoned, which is a continuation-in-part of application No. 11/073,578, filed on Mar. 8, 2005, now abandoned.

(56) References Cited

U.S. PATENT DOCUMENTS

| | | | |
|---|---|---|---|
| 2005/0203768 A1* | 9/2005 | Florance | G06Q 30/0643 701/438 |
| 2005/0262016 A1* | 11/2005 | Hill | G06Q 20/10 705/39 |
| 2005/0288957 A1* | 12/2005 | Eraker | G06Q 30/00 345/630 |

* cited by examiner

SYSTEM FOR RETRIEVING AND SERVING THE REGULATORY HISTORY OF A PROPERTY INCLUDING MOBILE WIRELESS COMMUNICATIONS DEVICE BASED SEARCHING AND RETRIEVAL AND RELATED METHODS

RELATED APPLICATIONS

This application is a continuation-in-part of Ser. No. 15/006,856 filed Jan. 26, 2016, which is a continuation of U.S. patent application Ser. No. 14/079,217, filed Nov. 13, 2013, which is a continuation of U.S. patent application Ser. No. 13/606,656, filed Sep. 7, 2012, which is a continuation of U.S. patent application Ser. No. 12/434,489, filed May 1, 2009, which is a continuation-in-part of U.S. patent application Ser. No. 12/419,112 filed Apr. 6, 2009, and is a continuation-in-part of U.S. patent application Ser. No. 12/252,413, filed Oct. 16, 2008, and is a continuation-in-part of U.S. patent application Ser. No. 11/945,988 filed Nov. 27, 2007, and is a continuation-in-part of U.S. patent application Ser. No. 11/073,578 filed Mar. 8, 2005, the entire disclosures of each of which are hereby incorporated by reference herein.

BACKGROUND

The regulatory history of a parcel of real property consists of past, present and future permits and approvals. Such future permits and approvals may be, e.g., permits and approvals necessitated or contemplated by new, proposed or anticipated legislation, regulations, laws, or other rules. Historically, governmental authorities provide citizens, corporations and other types of entities, non-governmental organizations and other governmental authorities access to the regulatory history of a parcel of real property via paper files.

Certain governmental authorities provide electronic access to portions of the regulatory history of property within the authority's jurisdiction. For example, in Florida, each county's property appraiser provides content to a county-specific database on which certain records connected with properties within the county are made available to the public.

In connection with real estate transactions, financing and development, parties perform regulatory due diligence which requires assembling the complete regulatory history of a property. Regulatory due diligence is typically performed by lawyers, engineers, land planners or other professionals. Liability considerations usually preclude assigning this work to assistants and clerical level personnel. The permits will certainly be reviewed by a professional and will be the subject of a final legal opinion or report. Overlooking a particular Permit or Approval could easily lead to an inaccurate and/or incomplete report and ultimately giving the wrong advice.

Currently, one has to travel to the offices of each of the applicable governmental authorities and in many cases, such as a local government, the various departments thereof such as the planning, zoning, building, public works, environmental resources and other departments. (Other governmental authorities are subdivided into bureaus, sections, districts and the like.) At the reception desk for each, one has to request the file for the particular property and provide the particular means of identifying that particular property used by that governmental authority or department thereof. Sometimes it is necessary to wait for the first available staff member to assist you. Other times you are pointed in the direction of banks of filing cabinets and left to locate the desired file on your own. The governmental authority or department may have a system for organizing the files that is either unfamiliar or altogether a poor system. Files may be disorganized, misplaced or inexplicably missing. Missing files may be checked out to or in use without any tracking or other record by a staff member of the governmental authority or department thereof and must be located. Once the file (or more likely files) is located, it (they) must be reviewed for the desired permits and approvals. Items to be copied which are usually voluminous and often include plans, drawings, or maps must be tabbed in some manner for copying by the first available clerical level employee of the governmental authority or department. Once copied, the governmental authority or department thereof collects for the copies. The process is repeated at the next governmental authority or department. Some governmental authorities or departments accept requests for copies of permits and approvals by letter and will process the request on an hourly rate basis, plus copy charges and shipping. Such governmental authorities have already or are in the process of scanning such paper files to convert them to a digital image that can be accessed electronically on the website of such governmental authority or department thereof by inputting the means of identifying such parcel of real property utilized by that particular governmental authority.

SUMMARY

A system for retrieving and serving the regulatory history of a property may include a plurality of first remote computers each having land use based regulatory history data associated therewith. The system may also include at least one second remote computer different from each of the plurality of first remote computers and having land use based regulatory history data associated therewith. The system may further include a communications network and a mobile wireless communications device that may include a device housing, an input device carried by the device housing, wireless communications circuitry carried by the device housing, and a controller coupled to the input device and the wireless communications circuitry. The controller may be configured to, based upon input from the input device, cooperate with the wireless communications circuitry to communicate with the plurality of first remote computers over the communications network to build a local database, store, in the local database, the land use based regulatory history data, and search the local database for a given real property based upon a given real property identifier associated therewith to determine which of the plurality of first remote computers has land use based regulatory history data available for the given real property. The controller may also be configured to, based upon input from the input device, retrieve land use based regulatory history data from the at least one second remote computer over the communications network based upon the given real property identifier when at least one of the land use based regulatory history data available for the given real property does not exceed a threshold amount and at least one of the plurality of first remote computers is not from a predetermined one thereof, and provide the land use based regulatory history data for the given real property to a user interface when at least one of the land use based regulatory history data available for the given real property exceeds the threshold amount and at least one of the plurality of first remote computers is from the predetermined one thereof.

The mobile wireless communications device may include a display carried by the device housing and defining the user interface. The controller may be configured to display the land use based regulatory history data for the given real property on the display, for example.

The controller may be configured to display the land use based regulatory history data for the given real property as a webpage on the display. The controller may be configured to overlay, on the display, data layers of geographic information system (GIS) data from each of the plurality of first remote computers, for example. The controller may be configured to overlay, on the display, data layers of building data for the given real property from each of the plurality of first remote computers, for example.

The input from the input device may include input of the given real property identifier from the input device. The land use based regulatory history data may include at least one of permit history data and approval history data, for example.

The plurality of first remote computers may include a plurality of first web servers each comprising a processor and memory coupled thereto. The communications network may include the Internet. At least one of the plurality of first remote computers may be associated with a governmental authority, for example.

A method aspect is directed to a method of retrieving and serving the regulatory history of a property using a mobile wireless communications device that includes a device housing, an input device carried by the device housing, wireless communications circuitry carried by the device housing, and a controller coupled to the input device and the wireless communications circuitry. The method may include using the controller, based upon input from the input device to cooperate with the wireless communications circuitry to communicate with a plurality of first remote computers over a communications network to build a local database and store, in the local database, land use based regulatory history data associated with the plurality of first remote computers. The method may also include using the controller, based upon input from the input device to search the local database for a given real property based upon a given real property identifier associated therewith to determine which of the plurality of first remote computers has land use based regulatory history data available for the given real property. The method may also include using the controller, based upon input from the input device, to retrieve land use based regulatory history data from at least one second remote computer different from each of the plurality of first remote computers and having land use based regulatory history data associated therewith over the communications network based upon the given real property identifier when at least one of the land use based regulatory history data available for the given real property does not exceed a threshold amount and at least one of the plurality of first remote computers is not from a predetermined one thereof. The method may further include using the controller, based upon input from the input device to provide the land use based regulatory history data for the given real property to a user interface when at least one of the land use based regulatory history data available for the given real property exceeds the threshold amount and at least one of the plurality of first remote computers is from the predetermined one thereof.

Another aspect is directed to a system for retrieving and serving the regulatory history of a property. The system may include a plurality of first remote computers each having land use based regulatory history data associated therewith, at least one second remote computer different from each of the plurality of first remote computers and having land use based regulatory history data associated therewith, and a communications network. The system may also include a land use data processing computer in the cloud and that includes a memory having a database, and a controller coupled to the memory. The controller may be configured to communicate with the plurality of first remote computers over the communications network to build the database, store, in the database, the land use based regulatory history data, and search the database for a given real property based upon a given real property identifier associated therewith to determine which of the plurality of first remote computers has land use based regulatory history data available for the given real property. The controller may also be configured to retrieve land use based regulatory history data from the at least one second remote computer over the communications network based upon the given real property identifier when at least one of the land use based regulatory history data available for the given real property does not exceed a threshold amount and at least one of the plurality of first remote computers is not from a predetermined one thereof. The controller may further be configured to communicate the land use based regulatory history data for the given real property to a local computer when at least one of the land use based regulatory history data available for the given real property exceeds the threshold amount and at least one of the plurality of first remote computers is from the predetermined one thereof. The local computer may be associated with a user and be remote from the land use data processing computer.

The controller may be configured to communicate with the plurality of first remote computers, store, in the database, the land use based regulatory history data, search the database for the given real property, retrieve the land use based regulatory history data from the at least one second remote computer, and communicate the land use based regulatory history data for the given real property to the local computer based upon a request from the local computer, for example. The local computer may include a display and a local computer controller coupled thereto and configured to display the land use based regulatory history data for the given real property on the display.

The land use based regulatory history data may include at least one of permit history data and approval history data. The land use based regulatory history data includes building plan data, for example.

The plurality of first remote computers may include a plurality of first web servers each including a processor and memory coupled thereto, for example. The communications network may include the Internet. The at least one of the plurality of first remote computers may be associated with a governmental authority, for example.

A method for retrieving and serving the regulatory history of a property using a land use data processing computer that includes a memory having a data and a controller coupled to the memory may include using the controller to communicate with a plurality of first remote computers each having land use based regulatory history data associated therewith over a communications network to build the database and store, in the database, the land use based regulatory history data. The method may also include using the controller to search the database for a given real property based upon a given real property identifier associated therewith to determine which of the plurality of first remote computers has land use based regulatory history data available for the given real property, retrieve land use based regulatory history data from at least one second remote computer different from each of the plurality of first remote computers over the communications network having land use based regulatory history data based upon the given real property identifier when at least one of the land use based regulatory history data available for the given real property does not exceed a threshold amount and at least one of the plurality of first remote computers is not from a predetermined one thereof. The method may also include using the controller to communicate the land use based regulatory history data for the given real property to a local computer when at least one of the land use based regulatory history data available for the given real property exceeds the threshold amount and at least one of the plurality of first remote computers is from the predetermined one thereof, the local computer associated with a user and remote from the land use data processing computer.

DETAILED DESCRIPTION

Figure 1:
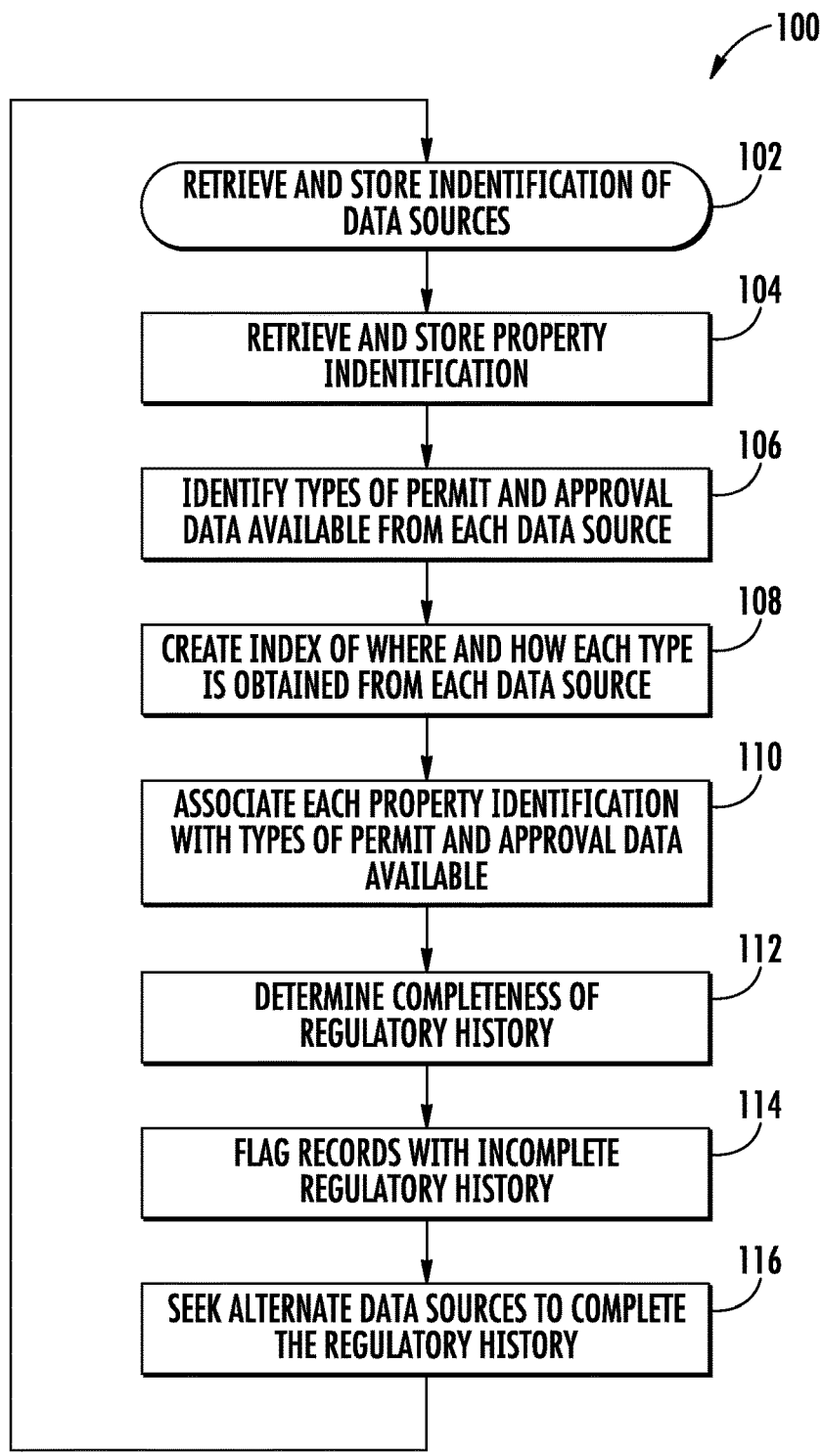
FIG. 1 shows a flowchart illustrating one embodiment of a method for operating a web crawler.

Reference will now be made in detail to embodiments of the present disclosure, examples of which are illustrated in the accompanying drawings.

In one embodiment, the present disclosure provides a method and system for retrieving and serving regulatory history for a property. In certain embodiments, the present disclosure includes a step of storing the regulatory history. The regulatory history for a property includes past, present and future actions of federal, state, regional, agency, local and other governmental authorities and departments, districts, bureaus or other subdivisions thereof relating to activities involving commercial and residential real estate and improvements thereon, such as ownership, sale, purchase, transfer, exchange, leasing, financing, development, change in intensity of use or density, management, maintenance, permitting, assemblage, subdivision, redevelopment, clearing, filling, expansion, construction, reconstruction, building, remodeling, alteration, tenant finish, demolition, rehabilitation, drilling, mining, excavation, deposit (refuse, solid or liquid waste or fill), conservation, mitigation, protection, remediation, landscaping, alteration of a shore or bank (of a seacoast, river, stream, lake, pond or canal), waterscaping, architecture, design, planning, engineering and legal and all other manner of permits and approvals pertaining to the property, including permits, approvals, waivers, exceptions, exemptions, findings, determinations, hearings, or other official action(s) by any such governmental authority or subdivision thereof in connection with any of the foregoing activities, building permits, zoning permits, plat approvals, subdivision approvals, rezonings, comprehensive plans amendments, certifications, special exceptions, variances, development orders (granting, denying or granting with conditions an application for any of the foregoing), and any of the foregoing pertaining to concurrency, consistency, development of regional impact, future land use map amendments, comprehensive plan amendments, annexation, or sector planning.

Users of the system include owners, developers, buyers, sellers, landlords, tenants, brokers, realtors, law firms, land planning firms, engineering firms, environmental permitting firms, brokerage firms (sales and leasing), surveying firms, appraisal firms, real estate management firms, federal, state and local governmental authorities, as well as others having an interest in or otherwise dealing with real estate and related matters.

The system obtains and provides to the user for their review and analysis permits and approvals of federal, state, regional, agency, local and other governmental authorities relating to activities involving commercial and residential real estate such as ownership, sale, purchase, transfer, exchange, leasing, financing, development, management, maintenance, permitting, assemblage, redevelopment, expansion, construction, reconstruction, remodeling, tenant finish, demolition, rehabilitation, conservation, mitigation, protection, remediation, landscaping, waterscaping, architecture, design, planning, engineering and legal.

The method utilizes data available through the internet to access a complete regulatory history of permits and approvals for a particular property from websites or other data sources of governmental authorities or similar sources, such as local government websites, property appraisers' websites, clerk's office websites, records retention websites, public library/recordkeeping websites, zoning/land development regulation websites, and the like. A web crawler can be used to automatically populate a database of available permits and approvals for particular properties.

FIG. 1 shows a method 100 for operation of a web crawler in accordance with certain embodiments. The steps shown may be iteratively repeated on a regular basis, such as each night or continuously. At step 102, the URLs of websites that are known to contain permit or approval data are stored in a local database. As an alternative to URLs, other identifiers sufficient to determine the network location of the data sources may be stored. The web crawler may be programmed to use keyword searches to automatically search the internet for appropriate data sources and retrieve the identifiers, with or without human intervention. The data identifying relevant data sources may also be input as a file containing, for example, comma separated values, or in XML format. The data identifying relevant data sources is stored in a local database, which may reside on the same physical computer as the web crawler software or on a separate computer.

At step 104, property identifiers are stored in the local database. The property identifiers include data sufficient to uniquely identify one or more properties about which permit and approval data are available from one or more of the data sources. The property identifiers may include tax parcel numbers, metes and bounds legal descriptions, section land legal descriptions, GPS coordinates, property addresses, subdivision plat description, State, City, County, Street Address, Lot Number, permit number or date, approval number or date, other significant date, or others. The property identifiers may be automatically retrieved from the data sources identified in step 102 by the web crawler. Alternatively, the property identifiers may be input as a file containing, for example, comma separated values, or in XML format.

At step 106, the web crawler identifies the types of permit and approval data available for the identified properties from each identified data source. Permit and approval types include, e.g., permit, approval, waiver, exception, exemption, building permit, zoning permit, platt approval, subdivision approval, rezoning, certification, special exception, variance, development order. Human intervention may be used along with the web crawler to classify permit and approval data available from a particular data source into a particular type. The types of permit approval data available from a particular data source are stored in the local database.

At step 108, the data types identified at step 106 are used to create an index of where and how each data type can be found on each data source.

At step 110, the types of permit and approval data available for a particular property from the various data sources are associated in the local database with the property identifier for the property.

At step 112 a determination of the completeness of the regulatory history that is available from all data sources for a particular property is determined. In this step, the system can apply business rules to determine whether a complete regulatory history, sufficient to rely upon for purposes of due diligence, is available to the system for each property. Such business rules include, e.g., whether regulatory history was found at a particular governmental authority where pertinent regulatory history would be expected to be found for the property of interest. At step 114, records for individual properties for which the regulatory history is incomplete are flagged in the local database.

At step 116, the system seeks alternate data sources to complete the regulatory history. As with the initial step of retrieving and storing an identification of data sources at step 102, step 116 may be automated or involve manual input of the identification of alternate data sources.

Figure 2:
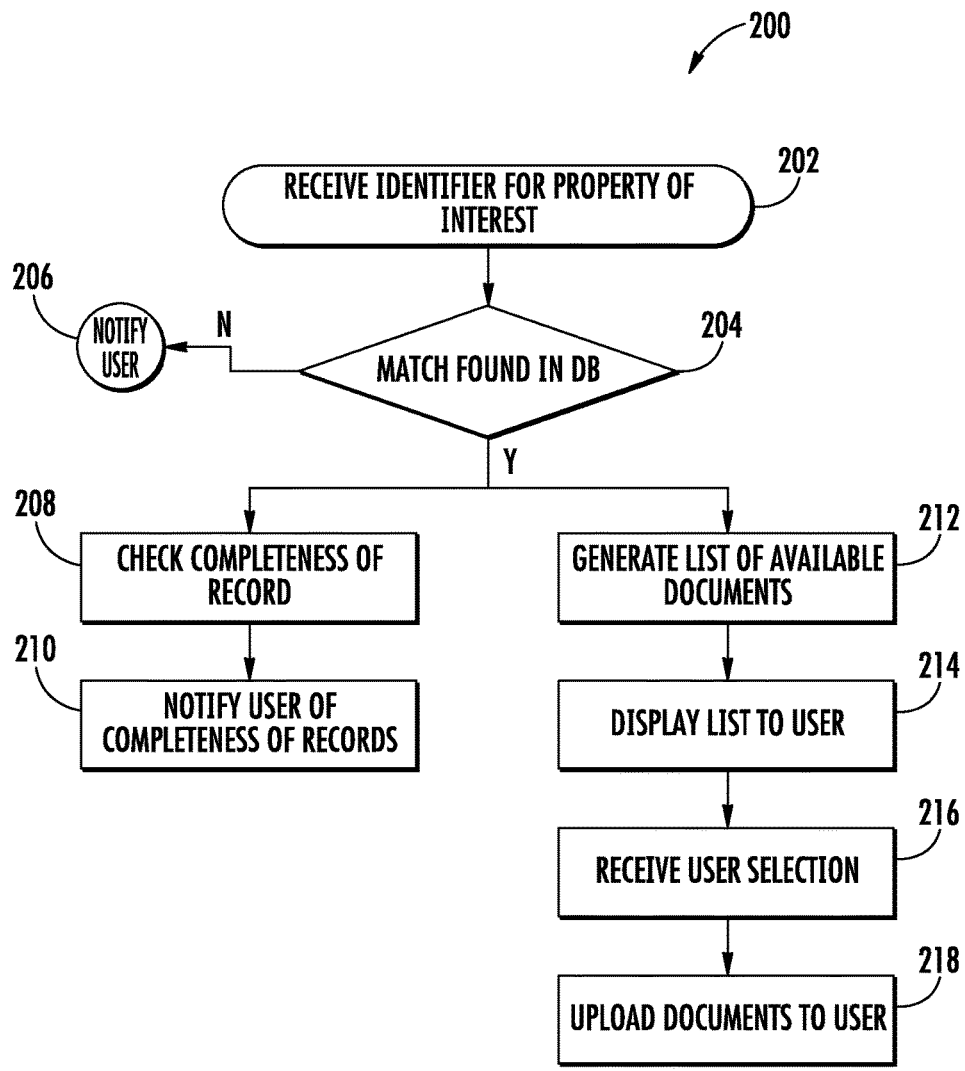
FIG. 2 shows a flowchart illustrating one embodiment of a method for receiving and serving requests from users.

FIG. 2 illustrates a method 200 by which the system assists a user in conducting regulatory due diligence once the web crawler has retrieved and stored data in accordance with FIG. 1. At step 202, the system receives from the user an identifier for a property of interest. The system may receive the information via a web interface to the user, by direct input of the identifier into the system by the user or others, via a private network, via the internet, or other known communication medium.

The identifier received from the user may be, e.g., one or more of: a tax parcel number, a metes and bounds legal description, a section land legal description, GPS coordinates, a property address, a subdivision plat description, a State, a City, a County, a Street Address, a Lot Number, or others. In an alternative embodiment, the system may receive all property identifiers for a particular property of interest.

At step 204, the system uses the identifier received from the user to identify one or more records in its local database for the specified property. As an alternative to consulting the local database, the system may go out to the data source and, using the identifier input by the user, retrieve property matches or possible matches, or additional property identifiers. The matching step 204 is preferably automatic, but could be performed manually. If a match is not found, the user is so notified at step 206. If multiple possible matches are found, the user may be prompted at this step to disambiguate between the matches. If a potential match is found, the user can be prompted to confirm the match. If below a certain predetermined threshold, the system would determine that there is a match. Otherwise, the system may alert the proprietor of the system to manually determine a match.

In layering maps or similar data from the governmental authorities, discrepancies may result in how the property is described by one governmental authority to the next arising from governmental authorities utilizing differing means to describe real property. The system may resolve any uncertainty in its matching process automatically as follows. The system using existing standard geographic information system (GIS) techniques determines any discrepancies between how the property is described from one governmental authority to the next, reconciles and thereby determines a match. This process may also be utilized with the data layering feature described below. In another embodiment, the system includes software code for displaying a map showing states, counties, cities, and similar types of jurisdictional limits of governmental authorities of all types.

In such embodiments, the system automatically performs an operation to determine the appropriate governmental authority for various purposes. For example, this operation would facilitate the identification of the appropriate governmental authority with jurisdiction over property taxes and the appropriate governmental authority with jurisdiction over permitting, which may be the same or different jurisdiction.

If step 204 results in a match being found in the local database, the completeness of the available records, which was determined previously at step 112 (FIG. 1), is checked and the user is notified of same at step 210.

At step 212, a list of available documents is generated. This step can be performed either online with the sources of available information or offline by referring to the local database. In online embodiments, the system uses the index created at step 108 (FIG. 1) to communicate with each of the sources of available information for the identified property and obtain from them lists of available documents for the property. Alternatively, in an offline embodiment, the system can refer to its local database to compile the list of all available documents for the property. At step 214, the list is displayed to the user.

At step 216, the system receives the user's selection of one or more documents to download. This selection may be a selection of all documents in the regulatory history of the property of interest. At step 218, the selected documents are uploaded to the user. In certain embodiments of the system, this step or previous steps will involve obtaining authorization from the user to charge a user's account or credit card for a fee for use of the system.

In certain embodiments, the system provides a data layering feature by which the computer automatically layers the maps or other data, e.g., GIS data, of each of the respective governmental authorities. Utilizing the software, the computer automatically searches the particular means of identifying the property that has been input by the user, such as a tax parcel number, metes and bounds legal description, section land legal description, GIS data, property address, subdivision plat description, GPS data, spatial data sets, spatial coordinates, unique I.D., centroid, cadastre, tabular data, attributes, non-spatial data, georeference data. etc., at each of the websites or data sources for the various governmental authorities until a match is found. In another embodiment, utilizing the software, the computer recognizes the form of the means of identifying the property that has been input by the user and automatically retrieves data from the website or data source of the governmental authority with the corresponding form before searching the websites or data sources of the other governmental authorities. For example, if the user inputted the tax parcel number for the particular property, utilizing the software, the computer would automatically run searches at the various governmental authorities for a match. In accordance with this example, a match is found at the applicable property appraiser's website. Utilizing the software, this match is used to identify the property. The data layering feature of the software enables the computer to automatically perform a layering of the maps or other data, e.g., GIS data, of other governmental authorities with the property appraiser's map or other data, e.g., GIS data, identifying the particular property resulting in the positive identification of the particular property for purposes of the websites or data sources of the other governmental authorities without regard to the means of identifying a particular property utilized by a particular governmental authority.

In one embodiment, utilizing the software, the computer retrieves and stores the particular means of identifying a property utilized by each governmental authority for later use in performing other operations. Having identified the particular property on each of the websites for each of the governmental authorities, the computer, utilizing the web crawler component of the present disclosure, automatically performs searches of the websites of the various governmental authorities for the permits and approvals, as previously defined. Therefore, utilizing the means of identifying a particular property employed by any one of the applicable governmental authorities, the data layering feature of the software would automatically identify a particular property at the websites of all of the governmental authorities.

In one embodiment, utilizing the software, the computer searches for and retrieves all permits and approvals for a particular property utilizing the method above. In another embodiment, utilizing the software, the computer performs only such part of the foregoing operations as may be necessary to execute a custom search ordered by a user. For example, a user desiring only a particular approval of one governmental authority would place an order providing the one or more means of identifying the particular property at his disposal and inputting as a custom search the name of the particular permit or permits desired to be obtained. In another embodiment, utilizing the software and a user interface feature a user under a custom search would view the layering of the maps or similar data and utilizing certain commands move from the website of one governmental authority to that of another governmental authority to scan for and select desired permits and approvals and related information.

The system can be configured such that volume users have an established account or other contractual relationship with the proprietor of the system. Volume users may be offered volume discounts. Other prospective users will go online to a web site associated with the system and complete a single transaction from time to time. Transactions may be priced on a flat fee basis, time to execute the transaction, kilobytes of data retrieved or similar bases of compensation.

Figure 3:
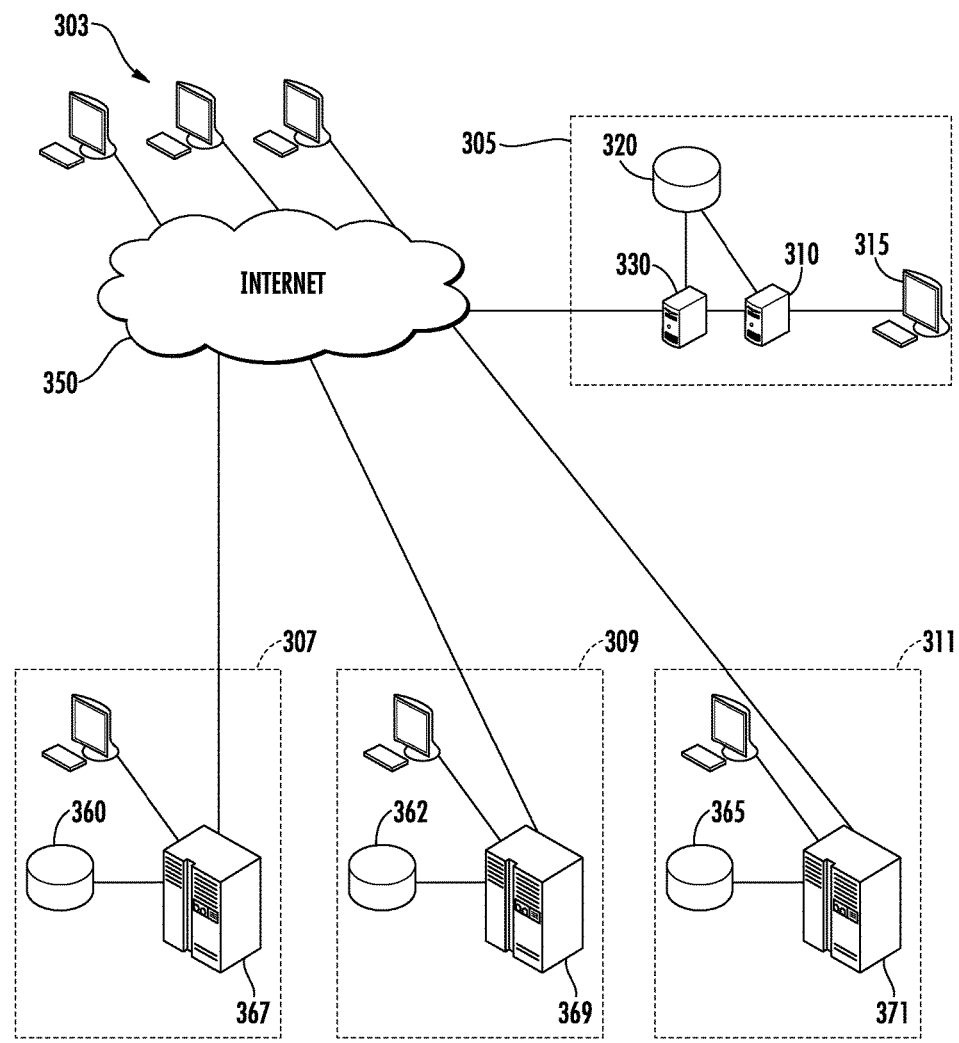
FIG. 3 shows a block diagram illustrating a system for practicing the methods of the disclosure.

FIG. 3 shows a block diagram of a system for carrying out the methods described above. A service provider 305 includes a web crawler 330 and a web server 310, which are accessed and controlled by one or more workstation computers 315. The web crawler 330 and the web server 310 both have access to a local database 320.

The web crawler 330 identifies and connects to a plurality of web servers 367, 369, 371 at data sources 307, 309, 311. The data sources 307, 309, 311 may be, e.g., government operated web sites. Each of the web servers 367, 369, 371 has access to a database 360, 362 and 365 wherein property records are stored. The web crawler queries the databases 360, 362, 365 via the web servers 367, 369, 371 to extract data and/or identify the URLs of the location of data or documents concerning particular properties. Of course, the data sources may be backend databases of governmental or non-governmental entities which are accessed directly by the system and not via a public-facing website. Such direct access can be provided by the database administrators, and such access may include access to fields and/or records in the database that are not accessible to the public via the public facing website.

In some embodiments, the system includes security measures to prevent hacking or other security concerns which may adversely affect a governmental authority or other data source. For example, firewall technologies can be utilized between the website or data source of the governmental authority and the system of the present disclosure.

Figure 4:
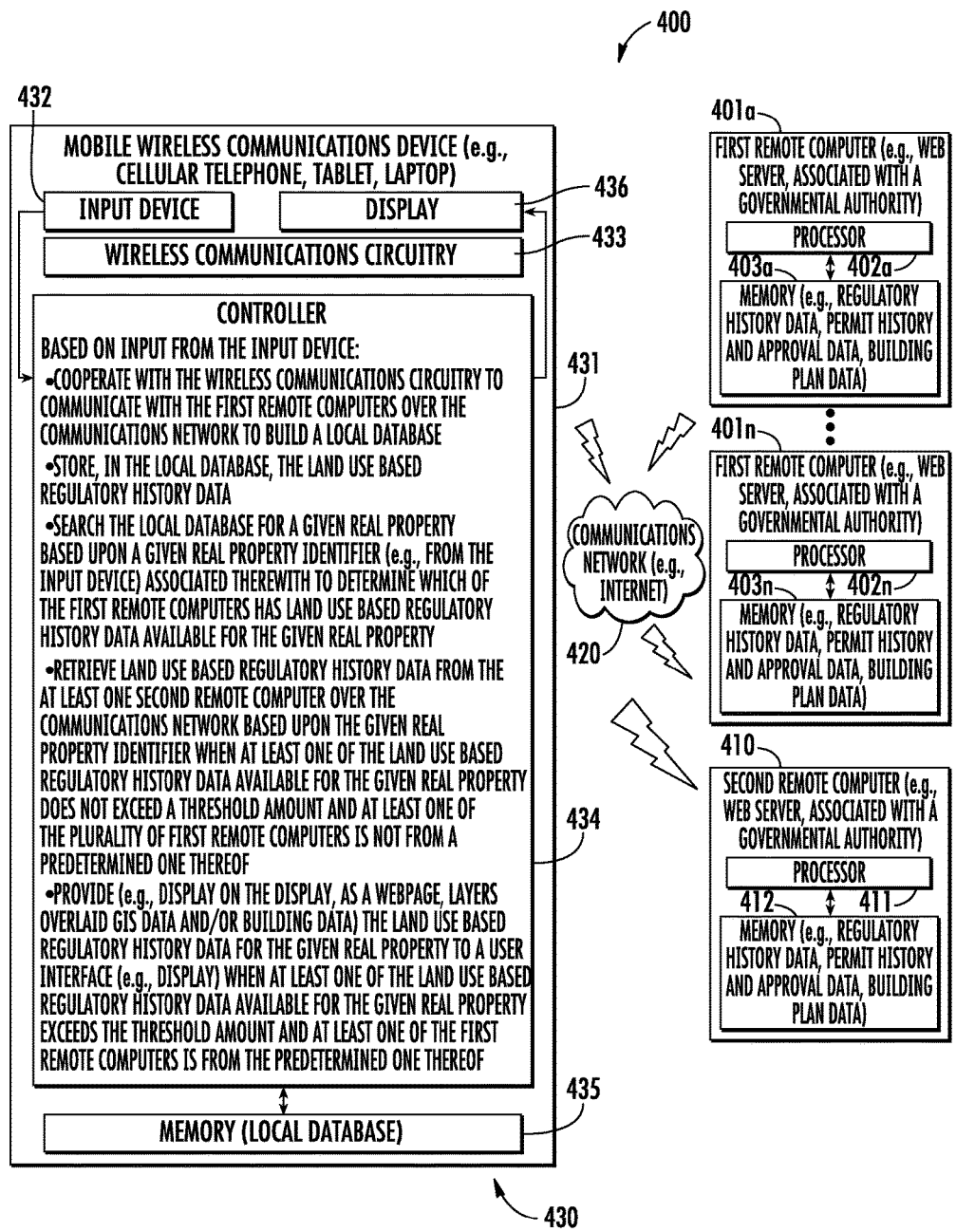
FIG. 4 is a schematic block diagram of a system for retrieving and serving regulatory history of a property in accordance with an embodiment.

Referring now to FIG. 4, in another embodiment, a system 400 for retrieving and serving the regulatory history of a property includes first remote computers 401a-401n each having land use based regulatory history data associated therewith. Land use based regulatory history data may include any one or more types of data described above. For example, any one or more of the first computers 401a-401n may be associated with a governmental authority and the land use based regulatory history data may include of permit history data and/or approval history data. The land use based regulatory history data may also include building data, for example, building plan data (i.e., structural, electrical, plumbing, alarm, life safety, etc.), which may be based upon permit data. Of course, land use based regulatory history data may include other and/or additional types of data, as will be appreciated by those skilled in the art.

The first remote computers 401a-401n may be in the form of web servers that each include a processor 402a-402n and a memory 403a-403n coupled thereto. The memory 403a-403n may store the land use based regulatory history data.

The system 400 also includes a second remote computer 410 that is different from or remote from each of the first remote computers 401a-401n. The second remote computer 410 also includes a processor 411 and a memory 412 coupled thereto for storing land use based regulatory history data, for example. There may be more than one second remote computer 410.

The system 400 further includes a communications network 420. The communications network 420 may include one or more wired and/or wireless networks, and include the Internet, for example.

The system 400 also includes a mobile wireless communications device 430 that includes a device housing 431 and an input device 432 carried by the device housing. The input device 432 may include a pushbutton switch, a keyboard, a touch-screen display and/or other type of input device, as will be appreciated by those skilled in the art.

The mobile wireless communications device 430 also includes wireless communications circuitry 433 carried by the device housing 431. The wireless communications circuitry 433 may include cellular, WiFi, Bluetooth, and/or other types of communications circuitry, which may be either or both of long and short range communications circuitry.

The mobile wireless communications device 430 also illustratively includes a display 436, which may define a user interface. In some embodiments, the mobile wireless communications device 430 may not include a display and other or additional hardware may couple to a user interface, which may be another device, for example. The mobile wireless communications device 430 is illustratively in the form of a mobile telephone, but it should be appreciated that the mobile wireless communications device may be any of a laptop computer, tablet computer, or wearable device, for example.

The mobile wireless communications device 430 also includes a controller 434 coupled to the input device 432 and the wireless communications circuitry 433.

Figure 5:
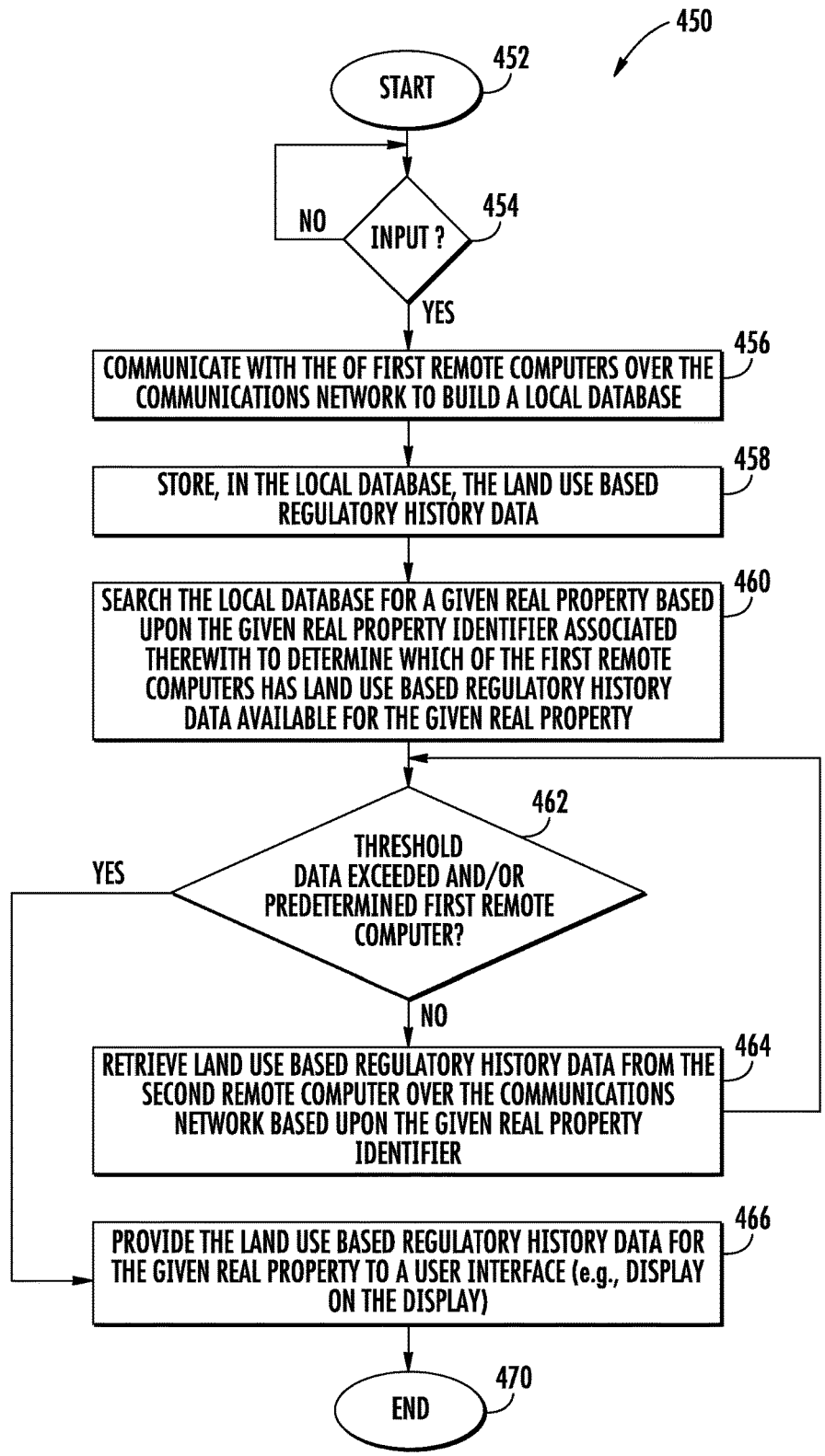
FIG. 5 is a flowchart illustrating operation of the system of FIG. 4.

Referring now additionally to the flowchart 450 in FIG. 5, beginning at Block 452 operations of the system 400 with respect to the controller 434 are now described. At Block 454, a determination is made as to whether input has been made to the input device 432, which may be in the form of a request to retrieve land use based regulatory history data. Accordingly, input to the input device 432 may include a real property identifier for a given real property. A real property identifier may include a physical address, geographic coordinates, tax identification, description, and/or any type of data that may be used to identify a real property. If no input, for example, in the form of a real property identifier, is input to the input device 432, the controller may poll until there is input. However, if input, such as, for example, a real property identifier along with a request to retrieve and serve the regulatory history of the given real property is received, the below described functions of the controller 434 are performed. In other words, the below described operations of the controller 434 are based upon input from the input device 432.

At Block 456, the controller 434 cooperates with the wireless communications circuitry 433 to communicate with the first remote computers 401*a*-401*n* over the communications network 420 to build a local database, for example, in a memory 435 of the mobile wireless communications device 430. The controller, at Block 458, stores, in the local database, the land use based regulatory history data, and searches, at Block 460, the local database for a given real property based upon the given real property identifier associated therewith to determine which of the first remote computers 401*a*-401*n* has land use based regulatory history data available for the given real property.

At Block 464, the controller 434 retrieves land use based regulatory history data from the second remote computer 410 over the communications network 420 based upon the given real property identifier when, at Block 462, at least one of the land use based regulatory history data available for the given real property does not exceed a threshold amount and at least one of the first remote computers 401*a*-401*n* is not from a predetermined one thereof. In other words, a determination is made as to the sufficiency of the retrieved land use based regulatory history data from the first remote computers 401*a*-401*n*, for example, by way of determining whether there is enough data, and/or whether the data comes from a particular source, for example, a trusted source or a particular governmental agency (e.g., a local permitting agency). As previously described there may be more than one second remote computer 410, and thus, if after retrieving land use based regulatory history data from the second remote computer there is still an insufficient amount of land use based regulatory history data or there is no trusted source (i.e., predetermined first remote computer or second remote computer), land based regulatory history data may be retrieved from a further second remote computer.

The controller 434, at Block 466 provides the land use based regulatory history data for the given real property to a user interface when either or both of the land use based regulatory history data available for the given real property exceeds the threshold amount and one or more of the first remote computers 401*a*-401*n* is from the predetermined one thereof. More particularly, at Block 466, the controller 434 displays the land use based regulatory history data for the given real property on the display 436. The controller 434 may display the land use based regulatory history data for the given real property as a webpage, for example, on the display 436, and/or may overlay data layers of GIS data, building data (e.g. plan data and infrastructure data from permit data) from each of the first remote computers 401*a*-401*n*. The method ends at Block 470.

As will be appreciated by those skilled in the art, the system 400 may particularly advantageous for providing building data, for example, information about a layout of a building, on demand. In one exemplary use case, the system 400 may be particularly useful to a first responder who may be desirous of knowing the layout of a building which may include locations of entries and exits, stairs, elevators, electrical turnoffs, etc. upon his or her arrival. Having this information, for example, available on the display 436 of the mobile wireless communications device 430, for example, in near real time, may increase the speed at which a given emergency situation (e.g., fire, medical emergency, hostage situation or other police emergency) is addressed.

Figure 6:
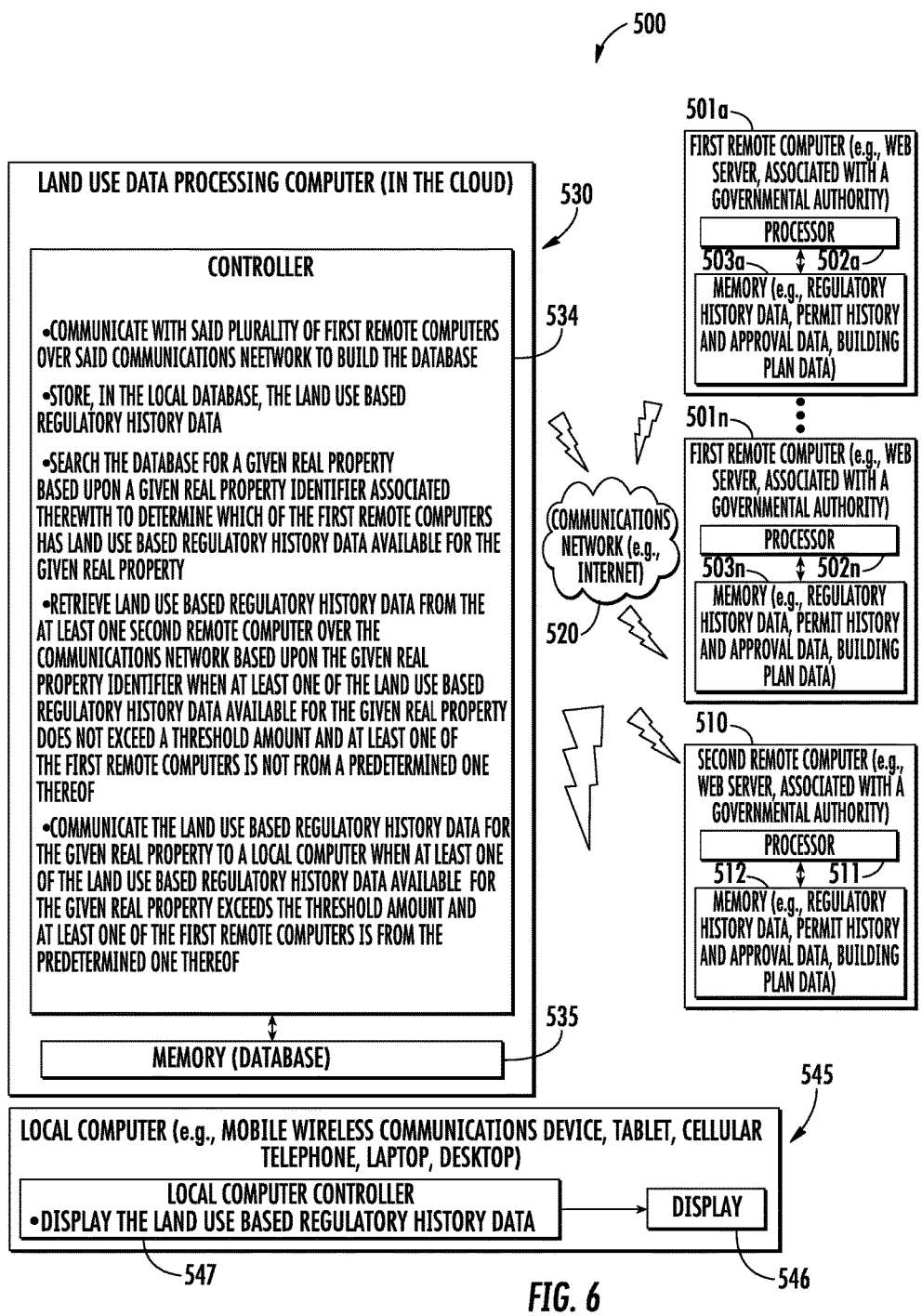
FIG. 6 is a schematic block diagram of a system for retrieving and serving regulatory history of a property in accordance with an embodiment.

Referring now to FIG. 6, in another embodiment, a system 500 for retrieving and serving the regulatory history of a property includes first remote computers 501*a*-501*n* each having land use based regulatory history data associated therewith. Land use based regulatory history data may include any one or more types of data described above. For example, any one or more of the first computers 501*a*-501*n* may be associated with a governmental authority and the land use based regulatory history data may include one of permit history data and/or approval history data. The land use based regulatory history data may also include building data, for example, building plan data (i.e., structural, electrical, plumbing, alarm, life safety, etc.), which may be based upon permit data. Of course, land use based regulatory history data may include other and/or additional types of data, as will be appreciated by those skilled in the art.

The first remote computers 501*a*-501*n* may be in the form of web servers that each include a processor 502*a*-502*n* and a memory 503*a*-503*n* coupled thereto. The memory 503*a*-503*n* may store the land use based regulatory history data.

The system 500 also includes a second remote computer 510 that is different from or remote from each of the first remote computers 501*a*-501*n*. The second remote computer 510 also includes a processor 511 and a memory 512 coupled thereto for storing land use based regulatory history data, for example. There may be more than one second remote computer 510.

The system 500 further includes a communications network 520. The communications network 520 may include one or more wired and/or wireless networks, and include the Internet, for example.

The system 500 also includes a land use data processing computer 530 in the cloud 540. The land use data processing computer 530 includes a memory 535 having a database, and a controller 534 coupled to the memory.

Figure 7:
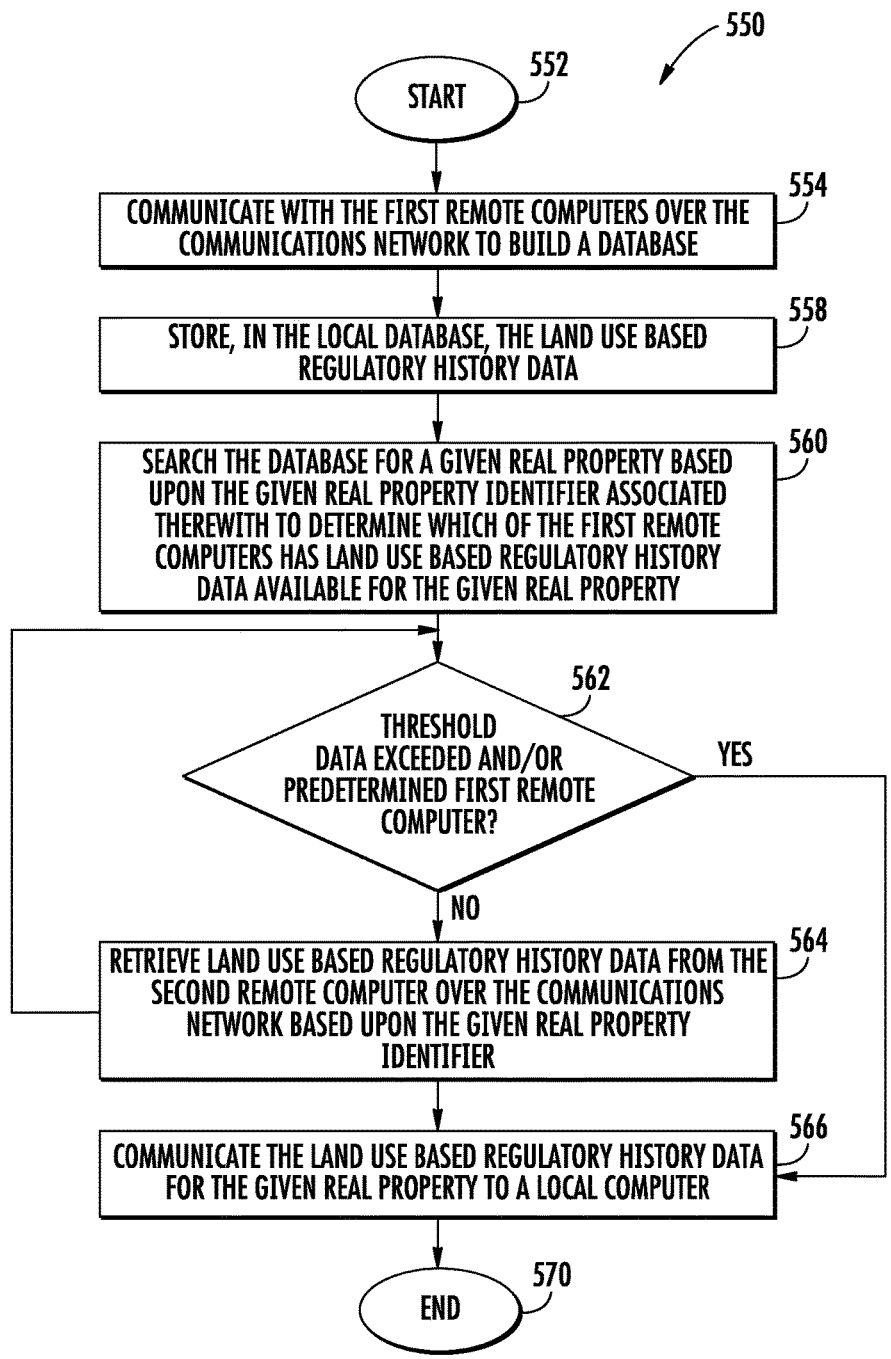
FIG. 7 is a flowchart illustrating operation of the system of FIG. 6.

Referring now additionally to the flowchart 550 in FIG. 7, beginning at Block 552 operations of the system 500 with respect to the controller 534 of the land use data processing computer 530 will be described. At Block 554, the controller 534 communicates with the first remote computers 501*a*-501*n* over the communications network 520 to build a database, for example, in the memory 535. The controller 534, at Block 558, stores, in the database, the land use based regulatory history data. The controller may periodically or continuously communicate with the first remote computers 501a-501n and store land use based regulatory history data, for example, that may have been added or updated so that the database may be current within a polling interval.

At Block 560, the controller 534 searches the database for a given real property based upon a real property identifier associated therewith to determine which of the first remote computers 501a-501n has land use based regulatory history data available for the given real property. The real property identifier may be received from a remote device, for example, a mobile wireless communications device. A real property identifier may include a physical address, geographic coordinates, tax identification, description, and/or any type of data that may be used to identify a real property.

At Block 564, the controller 534 retrieves land use based regulatory history data from the second remote computer 510 over the communications network 520 based upon the given real property identifier when, at Block 562, at least one of the land use based regulatory history data available for the given real property does not exceed a threshold amount and at least one of the first remote computers 501a-501n is not from a predetermined one thereof. In other words, a determination is made, at Block 562, as to the sufficiency of the retrieved land use based regulatory history data from the first remote computers 501a-501n, for example, by way of determining whether there is enough data, and/or whether the data comes from a particular source, for example, a trusted source or a particular governmental agency (e.g., a local permitting agency). As previously described there may be more than one second remote computer 510, and thus, if after retrieving land use based regulatory history data from the second remote computer there is still an insufficient amount of land use based regulatory history data or there is no trusted source (i.e., predetermined first remote computer or second remote computer), land based regulatory history data may be retrieved from a further second remote computer.

The controller 534, at Block 566 communicates the land use based regulatory history data for the given real property to a local computer 545 when either or both of the land use based regulatory history data available for the given real property exceeds the threshold amount and one or more of the first remote computers 501a-501n is from the predetermined one thereof. The local computer 545 is associated with a user and is remote from the land use data processing computer 530. More particularly, the local computer 545 may be a user computer (laptop, tablet, desktop, etc.), a user's cellular telephone, or other computing device. The local computer 545 may include a display 546 and a local computer controller 547 coupled thereto. The local computer controller 547 may display the land use based regulatory history data for the given real property on the display 546. The controller 547 may display the land use based regulatory history data for the given real property as a webpage, for example, on the display 546, and/or may overlay data layers of GIS data, building data (e.g., plan data and infrastructure data from permit data) from each of the first remote computers 501a-501n. The method ends at Block 570.

Figure 8:
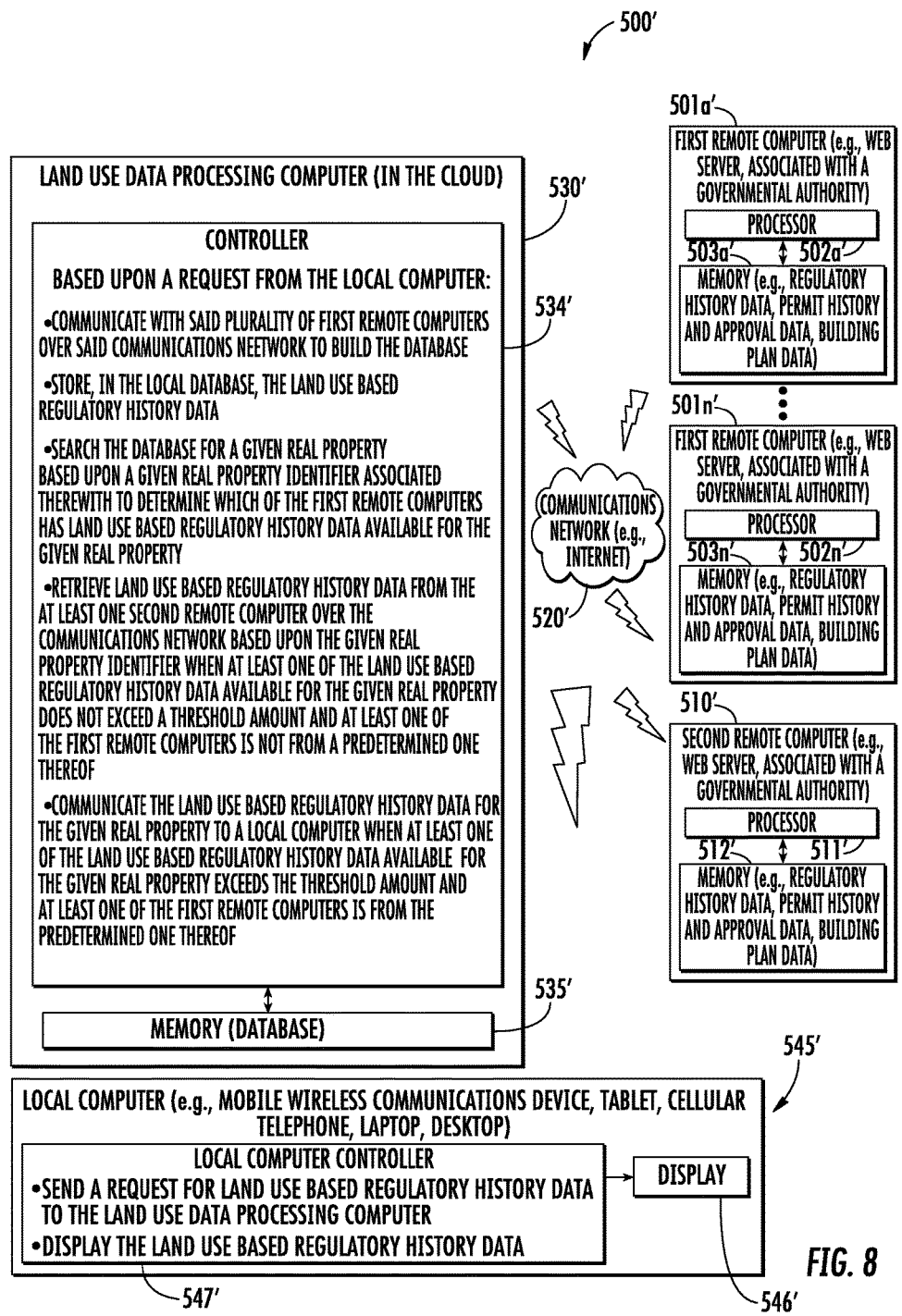
FIG. 8 is a schematic block diagram of a system for retrieving and serving regulatory history of a property in accordance with another embodiment.

Referring briefly to FIG. 8, in another embodiment, the controller 534' communicates with the first remote computers 501a'-501n', stores, in the database, the land use based regulatory history data, searches the database for the given real property, retrieves the land use based regulatory history data from the at least one second remote computer 510', and communicates the land use based regulatory history data for the given real property to the local computer based upon a request from the local computer 545'. In other words, similar to the embodiment described above with reference to FIGS. 4-5, the operations of the controller 534' are based upon input from or a request from the local computer 545'.

As will be appreciated by those skilled in the art, the system 500 may particularly advantageous for providing building data, for example, information about a layout of a building, on demand. In one exemplary use case, the system 500 may be particularly useful to an a first responder who may be desirous of knowing the layout of a building which may include locations of entries and exits, stairs, elevators, electrical turnoffs, etc. upon his or her arrival. Having this information, for example, available on the display 546 of the local computer 545, for example, in near real time, may increase the speed at which a given emergency situation (e.g., fire, medical emergency, hostage situation or other police emergency) is addressed.

While several different embodiments have been described herein, it should be understood that elements of the different embodiments may be used together. Moreover, embodiments may include a non-transitory computer readable medium that includes computer instructions that when executed by one of processors or controllers described herein causes the processor or controller to perform the respective functions described herein.

While the present invention has been particularly shown and described with respect to certain embodiments thereof, it should be readily apparent to those of ordinary skill in the art that various changes and modification in form and details may be made without departing from the spirit of the invention and the scope of the appended claims. It is intended that the present invention cover modifications and variations of this invention within the scope of the appended claims and their equivalents. The invention described is not limited to the various examples and embodiments in this document, but rather, it is intended that the individual claims point out and claim the invention.

That which is claimed is:

1. A system for retrieving and serving the regulatory history of a property comprising:
   a plurality of first remote computers each of which is respectively associated with at least one governmental authority each having land use based regulatory history data associated therewith;
   at least one second remote computer different from each of the plurality of first remote computers and having land use based regulatory history data associated therewith;
   a communications network; and
   a mobile wireless communications device comprising
      a device housing,
      an input device carried by said device housing,
      a display carried by said device housing and defining a user interface,
      wireless communications circuitry carried by said device housing, and
      a controller coupled to said input device, said display, and said wireless communications circuitry, said controller configured to, based upon input from said input device,
         cooperate with said wireless communications circuitry to communicate with said plurality of first remote computers over said communications network to build a local database including an index of where each data type can be found on said plurality of first computers, store, in the local database, land use based regulatory history data including at least one of permit history data and approval history data, automatically search the local database for a given real property based upon a given real property identifier associated therewith to determine which of said plurality of first remote computers has land use based regulatory history data available for the given real property, automatically determine a potential match for the given real property based on a predetermined threshold and prompt the user to confirm the match, automatically make a determination as to the sufficiency of retrieved land use based regulatory history data from the plurality of first remote computers by determining whether the land use based regulatory history data comes from a trusted source or a particular governmental authority at a predetermined one of the plurality of first remote computers, automatically determine whether a complete regulatory history, which is sufficient to rely upon for purposes of due diligence, is available to the system for the given real property and flag a record corresponding to the given real property if the regulatory history for the record is incomplete, automatically retrieve land use based regulatory history data from said at least one second remote computer over said communications network based upon the given real property identifier when at least one of the land use based regulatory history data available for the given real property does not exceed a threshold amount and at least one of the plurality of first remote computers is not the predetermined one thereof, automatically provide the land use based regulatory history data for the given real property to the user interface for display thereon when at least one of the land use based regulatory history data available for the given real property exceeds the threshold amount and at least one of the plurality of first remote computers is from the predetermined one thereof, and automatically layer, on said display, geographic information system (GIS) data from at least one of said plurality of first remote computers, wherein said controller is configured to overlay, on said display, at least one of data layers of building data and data layers of permit data for the given real property from each of said plurality of first remote computers and display the layering of the GIS data on the display based upon input from said input device.

2. The system of claim 1 wherein said controller is configured to display the land use based regulatory history data for the given real property as a webpage on said display.

3. The system of claim 1 wherein the input from said input device comprises input of the given real property identifier from said input device.

4. The system of claim 1 wherein said plurality of first remote computers comprises a plurality of first web servers each comprising a processor and memory coupled thereto.

5. The system of claim 1 wherein said communications network comprises the Internet.

6. A mobile wireless communications device for a system for retrieving and serving the regulatory history of a property, the system comprising a plurality of first remote computers each of which is respectively associated with at least one governmental authority each having land use based regulatory history data associated therewith, at least one second remote computer different from each of the plurality of first remote computers and having land use based regulatory history data associated therewith, and a communications network, the mobile wireless communications device comprising:

a device housing;

an input device carried by said device housing;

wireless communications circuitry carried by said device housing;

a display carried by said device housing; and a controller coupled to said input device and said wireless communications circuitry, said controller configured to, based upon input of a given real property identifier from said input device, cooperate with said wireless communications circuitry to communicate with said plurality of first remote computers over said communications network to build a local database including an index of where each data type can be found on the plurality of first computers, store, in the local database, the land use based regulatory history data including at least one of permit history data and approval history data, automatically search the local database for a given real property based upon the given real property identifier associated therewith to determine which of said plurality of first remote computers has land use based regulatory history data available for the given real property, automatically determine a potential match for the given real property based on a predetermined threshold and prompt the user to confirm the match, automatically make a determination as to the sufficiency of retrieved land use based regulatory history data from the plurality of first remote computers by determining whether the land use based regulatory history data comes from a trusted source or a particular governmental authority at a predetermined one of the plurality of first remote computers, automatically determine whether a complete regulatory history, which is sufficient to rely upon for purposes of due diligence, is available to the system for the given real property and flag a record corresponding to the given real property if the regulatory history for the record is incomplete, automatically retrieve land use based regulatory history data from the at least one second remote computer over the communications network based upon the given real property identifier when at least one of the land use based regulatory history data available for the given real property does not exceed a threshold amount and at least one of the plurality of first remote computers is not the predetermined one thereof, automatically display the land use based regulatory history data for the given real property on said display when at least one of the land use based regulatory history data available for the given real property exceeds the threshold amount and at least one of the plurality of first remote computers is from the predetermined one thereof, and automatically layer, on said display, geographic information system (GIS) data from at least one of said plurality of first remote computers,
wherein said controller is configured to overlay, on said display, at least one of data layers of building data and data layers of permit data for the given real property from each of the plurality of first remote computers and display the layering of the GIS data on the display based upon input from said input device.

7. The mobile wireless communications device of claim 6 wherein said controller is configured to display the land use based regulatory history data for the given real property as a webpage on said display.

8. A method of retrieving and serving the regulatory history of a property using a mobile wireless communications device comprising a device housing, an input device carried by the device housing, a display carried by the device housing and defining a user interface, wireless communications circuitry carried by the device housing, and a controller coupled to the input device, the display, and the wireless communications circuitry, the method comprising:
using the controller, based upon input from the input device to
cooperate with the wireless communications circuitry to communicate with a plurality of first remote computers over a communications network to build a local database including an index of where each data type can be found on the plurality of first computers,
store, in the local database, land use based regulatory history data associated with the plurality of first remote computers each of which is respectively associated with at least one governmental authority, the land use based regulatory history data including an index of where each data type can be found on the plurality of first computers,
automatically search the local database for a given real property based upon a given real property identifier associated therewith to determine which of the plurality of first remote computers has land use based regulatory history data available for the given real property,
automatically determine a potential match for the given real property based on a predetermined threshold and prompt the user to confirm the match,
automatically make a determination as to the sufficiency of retrieved land use based regulatory history data from the plurality of first remote computers by determining whether the land use based regulatory history data comes from a trusted source or a particular governmental authority at a predetermined one of the plurality of first remote computers,
automatically determine whether a complete regulatory history, which is sufficient to rely upon for purposes of due diligence, is available to the system for the given real property and flag a record corresponding to the given real property if the regulatory history for the record is incomplete,
automatically retrieve land use based regulatory history data from at least one second remote computer different from each of the plurality of first remote computers and having land use based regulator history data associated therewith over the communications network based upon the given real property identifier when at least one of the land use based regulatory history data available for the given real property does not exceed a threshold amount and at least one of the plurality of first remote computers is not the predetermined one thereof,
automatically provide the land use based regulatory history data for the given real property to the user interface for display thereon when at least one of the land use based regulatory history data available for the given real property exceeds the threshold amount and at least one of the plurality of first remote computers is from the predetermined one thereof, and
automatically layer, on the display, geographic information system (GIS) data from at least one of the plurality of first remote computers,
wherein the controller is used to overlay, on the display, at least one of data layers of building data and data layers of permit data for the given real property from each of the plurality of first remote computers and display the layering of the GIS data on the display based upon input from the input device.

9. The method of claim 8 wherein the controller is used to display the land use based regulatory history data for the given real property as a webpage on the display.

10. A system for retrieving and serving the regulatory history of a property comprising:
a plurality of first remote computers each having land use based regulatory history data associated therewith each of which is respectively associated with at least one governmental authority;
at least one second remote computer different from each of the plurality of first remote computers and having land use based regulatory history data associated therewith;
a communications network; and
a land use data processing computer in the cloud and comprising
a memory having a database, and
a controller coupled to said memory and configured to
communicate with said plurality of first remote computers over said communications network to build the database including an index of where each data type can be found on said plurality of first computers,
store, in the database, the land use based regulatory history data including at least one of permit history data and approval history data,
automatically search the database for a given real property based upon a given real property identifier associated therewith to determine which of said plurality of first remote computers has land use based regulatory history data available for the given real property,
automatically determine a potential match for the given real property based on a predetermined threshold and prompt the user to confirm the match,
automatically make a determination as to the sufficiency of retrieved land use based regulatory history data from said plurality of first remote computers by determining whether the land use based regulatory history data comes from a trusted source or a particular governmental authority at a predetermined one of said plurality of first remote computers,
automatically determine whether a complete regulatory history, which is sufficient to rely upon for purposes of due diligence, is available to the system for the given real property and flag a record corresponding to the given real property if the regulatory history for the record is incomplete, automatically retrieve land use based regulatory history data from said at least one second remote computer over said communications network based upon the given real property identifier when at least one of the land use based regulatory history data available for the given real property does not exceed a threshold amount and at least one of the plurality of first remote computers is not the predetermined one thereof, automatically communicate the land use based regulatory history data for the given real property to a local computer when at least one of the land use based regulatory history data available for the given real property exceeds the threshold amount and at least one of the plurality of first remote computers is from the predetermined one thereof, the local computer associated with a user and remote from the land use data processing computer, the local computer comprising a display and a local computer controller coupled thereto and configured to display the land use based regulatory history data for the given real property on the display and automatically layer, on the display, geographic information system (GIS) data from at least one of the plurality of first remote computers, the local computer controller further configured to overlay, on the display, at least one of data layers of building data and data layers of permit data for the given real property from each of said plurality of first remote computers and display the layering of the GIS data on the display based upon input from an input device coupled to the local computer controller.

11. The system of claim 10 wherein said controller is configured to communicate with said plurality of first remote computers, store, in the database, the land use based regulatory history data, search the database for the given real property, retrieve the land use based regulatory history data from said at least one second remote computer, and communicate the land use based regulatory history data for the given real property to the local computer based upon a request from the local computer.

12. The system of claim 10 wherein said plurality of first remote computers comprises a plurality of first web servers each comprising a processor and memory coupled thereto.

13. The system of claim 10 wherein said communications network comprises the Internet.

14. A land use data processing computer in the cloud for a system for retrieving and serving the regulatory history of a property comprising a plurality of first remote computers each of which is respectively associated with at least one governmental authority each having land use based regulatory history data associated therewith, at least one second remote computer different from each of the plurality of first remote computers and having land use based regulatory history data associated therewith, and a communications network, the land use data processing computer in the cloud and comprising:

a memory having a database; and
a controller coupled to said memory and configured to communicate with the plurality of first remote computers over the communications network to build the database including an index of where each data type can be found on the plurality of first computers, store, in the database, the land use based regulatory history data including at least one of permit history data and approval history data, automatically search the database for a given real property based upon a given real property identifier associated therewith to determine which of the plurality of first remote computers has land use based regulatory history data available for the given real property, automatically determine a potential match for the given real property based on a predetermined threshold and cause a local computer to prompt the user to confirm the match, automatically make a determination as to the sufficiency of retrieved land use based regulatory history data from the plurality of first remote computers by determining whether the land use based regulatory history data comes from a trusted source or a particular governmental authority at a predetermined one of the plurality of first remote computers, automatically determine whether a complete regulatory history, which is sufficient to rely upon for purposes of due diligence, is available to the system for the given real property and flag a record corresponding to the given real property if the regulatory history for the record is incomplete, automatically retrieve land use based regulatory history data from the at least one second remote computer different from the plurality of first remote computers over the communications network based upon the given real property identifier when at least one of the land use based regulatory history data available for the given real property does not exceed a threshold amount and at least one of the plurality of first remote computers is not the predetermined one thereof, and automatically communicate the land use based regulatory history data for the given real property to the local computer when at least one of the land use based regulatory history data available for the given real property exceeds the threshold amount and at least one of the plurality of first remote computers is from the predetermined one thereof, the local computer associated with a user and remote from the land use data processing computer, the local computer comprising a display and a local computer controller coupled thereto and configured to display the land use based regulatory history data for the given real property on the display and automatically layer, on the display, geographic information system (GIS) data from at least one of the plurality of first remote computers, the local computer controller further configured to overlay, on the display, at least one of data layers of building data and data layers of permit data for the given real property from each of said plurality of first remote computers and display the layering of the GIS data on the display based upon input from an input device coupled to the local computer controller.

15. The land use data processing computer of claim 14 wherein said controller is configured to communicate with the plurality of first remote computers, store, in the database, the land use based regulatory history data, search the database for the given real property, retrieve the land use based regulatory history data from the at least one second remote computer, and communicate the land use based regulatory history data for the given real property to the local computer based upon a request from the local computer.

16. A method for retrieving and serving the regulatory history of a property using a land use data processing computer comprising a memory having a database and a controller coupled to the memory, the method comprising:
using the controller to
communicate with a plurality of first remote computers each of which is respectively associated with at least one governmental authority each having land use based regulatory history data associated therewith over a communications network to build the database including an index of where each data type can be found on the plurality of first computers,
store, in the database, the land use based regulatory history data including at least one of permit history data and approval history data,
automatically search the database for a given real property based upon a given real property identifier associated therewith to determine which of the plurality of first remote computers has land use based regulatory history data available for the given real property,
automatically determine a potential match for the given real property based on a predetermined threshold and prompt the user to confirm the match,
automatically make a determination as to the sufficiency of retrieved land use based regulatory history data from the plurality of first remote computers by determining whether the land use based regulatory history data comes from a trusted source or a particular governmental authority at a predetermined one of the plurality of first remote computers,
automatically determine whether a complete regulatory history, which is sufficient to rely upon for purposes of due diligence, is available to the system for the given real property and flag a record corresponding to the given real property if the regulatory history for the record is incomplete,
automatically retrieve land use based regulatory history data from at least one second remote computer different from each of the plurality of first remote computers over the communications network having land use based regulatory history data based upon the given real property identifier when at least one of the land use based regulatory history data available for the given real property does not exceed a threshold amount and at least one of the plurality of first remote computers is not the predetermined one thereof, and
automatically communicate the land use based regulatory history data for the given real property to a local computer when at least one of the land use based regulatory history data available for the given real property exceeds the threshold amount and at least one of the plurality of first remote computers is from the predetermined one thereof, the local computer associated with a user and remote from the land use data processing computer, the local computer comprising a display and a local computer controller coupled thereto and configured to display the land use based regulatory history data for the given real property on the display and automatically layer, on the display, geographic information system (GIS) data from at least one of the plurality of first remote computers, the local computer controller further configured to overlay, on the display, at least one of data layers of building data and data layers of permit data for the given real property from each of the plurality of first remote computers and display the layering of the GIS data on the display based upon input from an input device coupled to the local computer controller.

17. The method of claim 16 wherein the controller is used to communicate with the plurality of first remote computers, store, in the database, the land use based regulatory history data, search the database for the given real property, retrieve the land use based regulatory history data from the at least one second remote computer, and communicate the land use based regulatory history data for the given real property to the local computer based upon a request from the local computer.

* * * * *